United States Patent
Lee et al.

(10) Patent No.: US 10,447,060 B2
(45) Date of Patent: Oct. 15, 2019

(54) CHARGING DEVICE AND CHARGING SYSTEM

(71) Applicant: Chicony Power Technology Co., Ltd., New Taipei (TW)

(72) Inventors: Shih-Chang Lee, New Taipei (TW); Chien-Hung Chen, New Taipei (TW); Chih-Chung Yen, New Taipei (TW); Chung-Shu Lee, Taipei (TW)

(73) Assignee: CHICONY POWER TECHNOLOGY CO., LTD., New Taipei (TW)

( * ) Notice: Subject to any disclaimer, the term of this patent is extended or adjusted under 35 U.S.C. 154(b) by 286 days.

(21) Appl. No.: 15/299,478

(22) Filed: Oct. 21, 2016

(65) Prior Publication Data

US 2018/0026468 A1    Jan. 25, 2018

(30) Foreign Application Priority Data

Jul. 22, 2016 (TW) .............................. 105123293 A (51) Int. Cl.
*H02J 7/00* (2006.01)
*H05B 37/02* (2006.01)
*H02J 7/02* (2016.01)

(52) U.S. Cl.
CPC .......... *H02J 7/0091* (2013.01); *H02J 7/0021* (2013.01); *H02J 7/0029* (2013.01); *H02J 7/0045* (2013.01); *H02J 7/0047* (2013.01); *H02J 7/0052* (2013.01); *H02J 7/0081* (2013.01); *H02J 7/02* (2013.01); *H05B 37/0227* (2013.01)

(58) Field of Classification Search
USPC ........................................................ 320/107
See application file for complete search history.

(56) References Cited

U.S. PATENT DOCUMENTS

| 6,154,012 A * | 11/2000 | Drori ................. G01R 31/3613 320/137 |
| 7,834,591 B2 | 11/2010 | Hussain et al. |
| 9,246,396 B2 | 1/2016 | Hsiao et al. |

(Continued)

FOREIGN PATENT DOCUMENTS

| CN | 101399439 B | 5/2011 |
| TW | M369581 U1 | 11/2009 |

(Continued)

*Primary Examiner* — Robert Grant
(74) *Attorney, Agent, or Firm* — CKC & Partners Co., LLC (57) ABSTRACT

A charging device includes a main control circuit, a connecting interface, a power supply circuit and a detecting circuit. When an energy storage element connects to the charging device, the connecting interface is coupled to two terminals of a temperature control element. The power supply circuit is coupled to the connecting interface and the main control circuit. The detecting circuit is coupled to the connecting interface. When the energy storage element connects to the charging device, the detecting circuit generates a detecting signal being used to trigger the power supply circuit to provide a main operating voltage to the main control circuit. When temperature of the energy storage element exceeds a threshold, the temperature control element makes the detecting circuit not to generate the detecting signal, so the power supply circuit ceases to provide the main operating voltage to the main control circuit.

8 Claims, 7 Drawing Sheets

(56) References Cited

U.S. PATENT DOCUMENTS

| | | | |
|---|---|---|---|
| 2007/0108941 A1* | 5/2007 | Sainomoto | H02J 7/0021 320/112 |
| 2010/0315846 A1 | 12/2010 | Lin | |
| 2014/0191568 A1 | 7/2014 | Partovi | |
| 2016/0043447 A1 | 2/2016 | Peh et al. | |

FOREIGN PATENT DOCUMENTS

| | | |
|---|---|---|
| TW | I396357 B1 | 5/2013 |
| TW | 201426271 A | 7/2014 |
| TW | I446155 B | 7/2014 |
| TW | 201439708 A | 10/2014 |
| TW | I477075 B | 3/2015 |
| TW | I477954 B | 3/2015 |
| TW | I481156 B | 4/2015 |

\* cited by examiner

CHARGING DEVICE AND CHARGING SYSTEM

RELATED APPLICATIONS

This application claims priority to Taiwan Application Serial Number 105123293, filed Jul. 22, 2016, which is herein incorporated by reference.

BACKGROUND

Technical Field

The present disclosure relates to a charging device. More particularly, the present disclosure relates to a charging device and a charging system having low standby consumption.

Description of Related Art

Electronic products have shaped the modern era, and citizens are requiring better and better performance of every type of electronic product. The most basic requirement for these electronic products is power. The rechargeable battery was created for the purpose of allowing electronic products to be used repeatedly, and the charging devices for charging the rechargeable batteries have been developed accordingly.

When a user wants to charge a rechargeable battery, the user typically needs to connect the charging device to a main source of electricity. The charging device will stabilize and transform the voltage of the main source of electricity and then charge the rechargeable battery. However, when the charging device is connected to the main source of electricity but isn't connected to the rechargeable battery, the power of the main source of electricity will still enter into the circuit of the charging device, resulting in energy consumption and possibly wasted power. Accordingly, there is a need for a standby mechanism to reduce energy consumption in a situation where a charging device isn't connected to a rechargeable battery. In traditional practices, the charging device usually lowers the energy consumption by utilizing a system which outputs switch control signals.

SUMMARY

An aspect of the present disclosure is a charging device. The charging device is used to charge an energy storage element. The charging device includes a main control circuit, a connecting interface, a power supply circuit and a detecting circuit. When the energy storage element connects to the charging device, the connecting interface is coupled to two terminals of a temperature control element. The power supply circuit is coupled to the connecting interface and the main control circuit. The detecting circuit is coupled to the connecting interface. When the energy storage element connects to the charging device, the detecting circuit generates a detecting signal, and the detecting signal is used to trigger the power supply circuit to provide a main operating voltage to the main control circuit. When temperature of the energy storage element exceeds a threshold, the temperature control element makes the detecting circuit not to generate the detecting signal, so the power supply circuit ceases to provide the main operating voltage to the main control circuit.

Another aspect of the present disclosure is a charging system. The charging system, comprising an energy storage element and a charging device. The energy storage element comprising a temperature control element. The charging device configured to charge the energy storage element, the charging device comprising a main control circuit, a connecting interface, a power supply circuit and a detecting circuit. When the energy storage element connects to the charging device, the connecting interface is coupled to two terminals of the temperature control element. The power supply circuit is coupled to the connecting interface and the main control circuit. The detecting circuit is coupled to the connecting interface. When the energy storage element connects to the charging device, the detecting circuit generates a detecting signal which is used to trigger the power supply circuit to provide a main operating voltage to the main control circuit. Wherein when temperature of the energy storage element exceeds a threshold, the temperature control element makes the detecting circuit not to generate the detecting signal and the power supply circuit ceases to provide the main operating voltage to the main control circuit.

The present disclosure discloses controlling the timing of the initiation of the main circuit of the charging device based on the operation of plugging in/out the battery, which minimizes the energy consumption of the charging device when in a standby mode. Further, the charging device disclosed by the present disclosure also has over-temperature protection in a timely manner for the battery. When operation temperature of the battery exceeds a safe temperature range, the charging device will cut off the output current immediately, so as to prevent the charging device from keeping charging the battery and causing a dangerous situation.

DETAILED DESCRIPTION

Specific embodiments of the present invention are further described in detail below with reference to the accompanying drawings, however, the embodiments described are not intended to limit the present invention and it is not intended for the description of operation to limit the order of implementation. Moreover, any device with equivalent functions that is produced from a structure formed by a recombination of elements shall fall within the scope of the present invention. Additionally, the drawings are only illustrative and are not drawn to actual size.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Moreover, terms of "comprise", "include", "have", etc. are open transitional phrases meaning "include but not limited to". In addition, the usage "and/or" in the specification includes any one of the listed items or a combination of the items.

Figure 1:
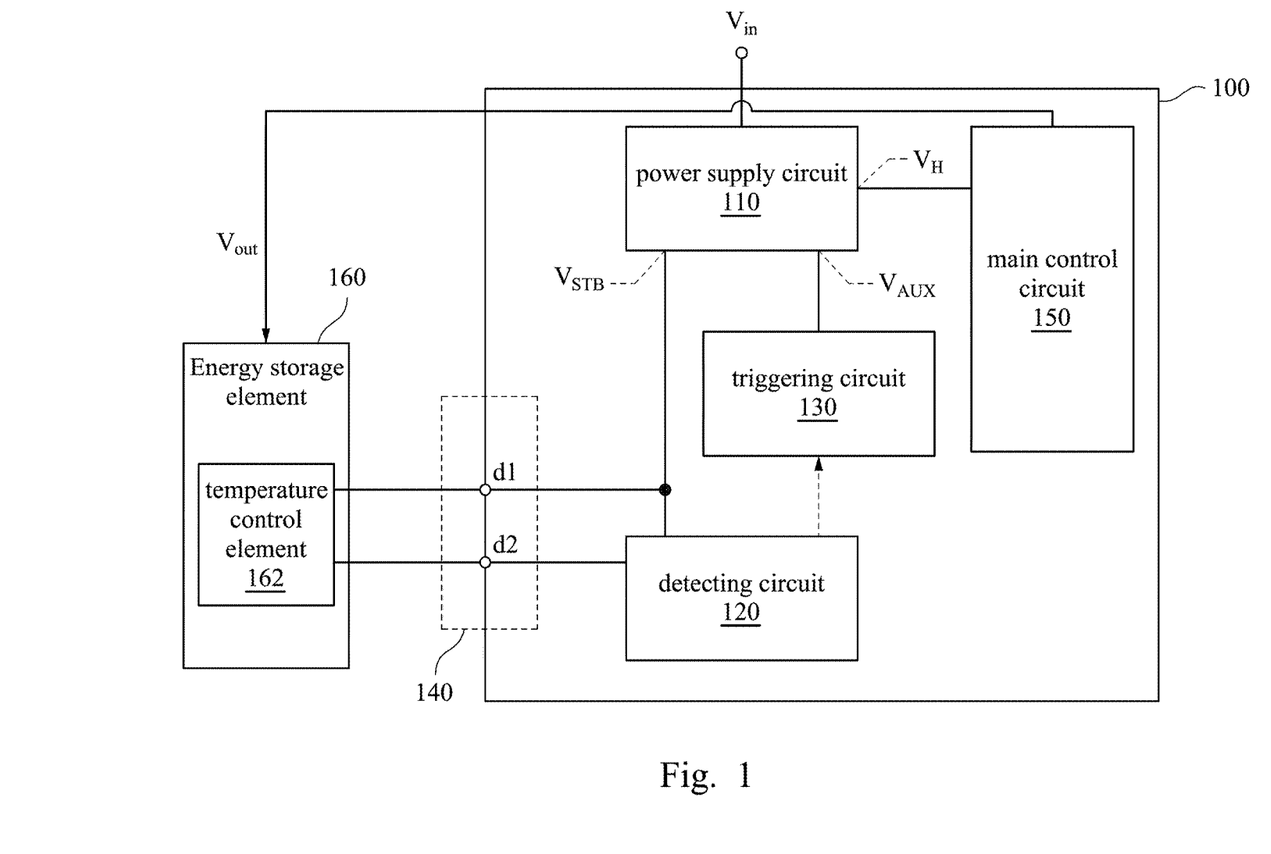
FIG. 1 is a configuration diagram of a charging system according to an embodiment of this disclosure.

FIG. 1 illustrates a configuration diagram of a charging system according to an embodiment of this disclosure. The charging system includes a charging device 100 and an energy storage element 160. The energy storage element 160 can be any kind of common rechargeable battery, such as nickel-cadmium (NiCd) battery, nickel-metal hydride (NiMH) battery, Lithium-ion (Li-ion) battery, lithium polymer (Li-Poly) battery, etc. The energy storage element 160 includes a temperature control element 162. The temperature control element 162 can be, for example, a thermistor having negative temperature coefficient (NTC) or any material that has different electronic characteristic at different temperature.

Generally speaking, when ambient temperature increases, the resistance of a thermistor having negative temperature coefficient will reduce. Accordingly, when the temperature of the energy storage element 160 changes, the temperature control element 162 can change part of the element coefficient to fulfill specific function, like over-temperature protection. The mechanism of the over-temperature protection will be described in detail later. It should be noted that, although the temperature control element 162 is depicted to be disposed in the energy storage element 160 in FIG. 1, in practical applications, the temperature control element 162 can also be disposed on the surface of the energy storage element 160, or at any location near the energy storage element 160.

The charging device 100 is used to charge the energy storage element 160. As depicted in FIG. 1, the charging device 100 includes a power supply circuit 110, a detecting circuit 120, a triggering circuit 130, a connecting interface 140 and a main control circuit 150. The power supply circuit 110 electrically connects to an exterior power source, the detecting circuit 120, the triggering circuit 130, the connecting interface 140 and the main control circuit 150. The exterior power source (e.g., household power or any kind of power source) provides input voltage $V_{in}$ to the power supply circuit 110. The power supply circuit 110 converts the input voltage $V_{in}$, provides a standby voltage $V_{STB}$ to the detecting circuit 120, provides an auxiliary voltage $V_{AUX}$ to the triggering circuit 130 and selectively provides a main operating voltage $V_H$ to the main control circuit 150.

In this embodiment, when the charging device 100 is in a standby mode, that is, when the charging device 100 has already connected to the exterior power source but doesn't connect to the energy storage element 160, the power supply circuit 110 converts the input voltage $V_{in}$ to provide the standby voltage $V_{STB}$ and the auxiliary voltage $V_{AUX}$.

The detecting circuit 120 is used to detect whether the charging device 100 connects to the energy storage element 160. When the charging device 100 connects to the energy storage element 160, the charging device 100 switches from the standby mode to an operating mode. According to a detection signal provided by the detecting circuit 120, the triggering circuit 130 triggers the power supply circuit 110 to provide the main operating voltage $V_H$ to the main control circuit 150.

The detection signal between the detecting circuit 120 and the triggering circuit 130 can be transmitted by, for example, an optical coupler, which is also called the optical isolator. In some embodiments, an optical coupler contains a light emitter and a light detector. The light emitter converts an input digital signal into light beam and transmits it to the light detector. The light detector can convert the light beam received into another digital signal. The light emitter and the light detector can deliver signal via the light beam, so the contents of the digital signals of the light detector and the light emitter can be corresponding to each other (e.g., being activated or turned off at the same time), and the light detector and the light emitter can maintain electrically insulation to each other (e.g., having different voltage levels or different currents).

The detecting circuit 120 separately connects to a terminal d1 and a terminal d2 of the connecting interface 140, and the power supply circuit 110 connects to the terminal d1 of the connecting interface 140. When the energy storage element 160 connects to the charging device 100, the terminal d1 and the terminal d2 of the connecting interface 140 are separately coupled to two terminals of the temperature control element 162. When the energy storage element 160 connects to the charging device 100, the main control circuit 150 generates an output voltage $V_{out}$ and charges the energy storage element 160.

Figure 2:
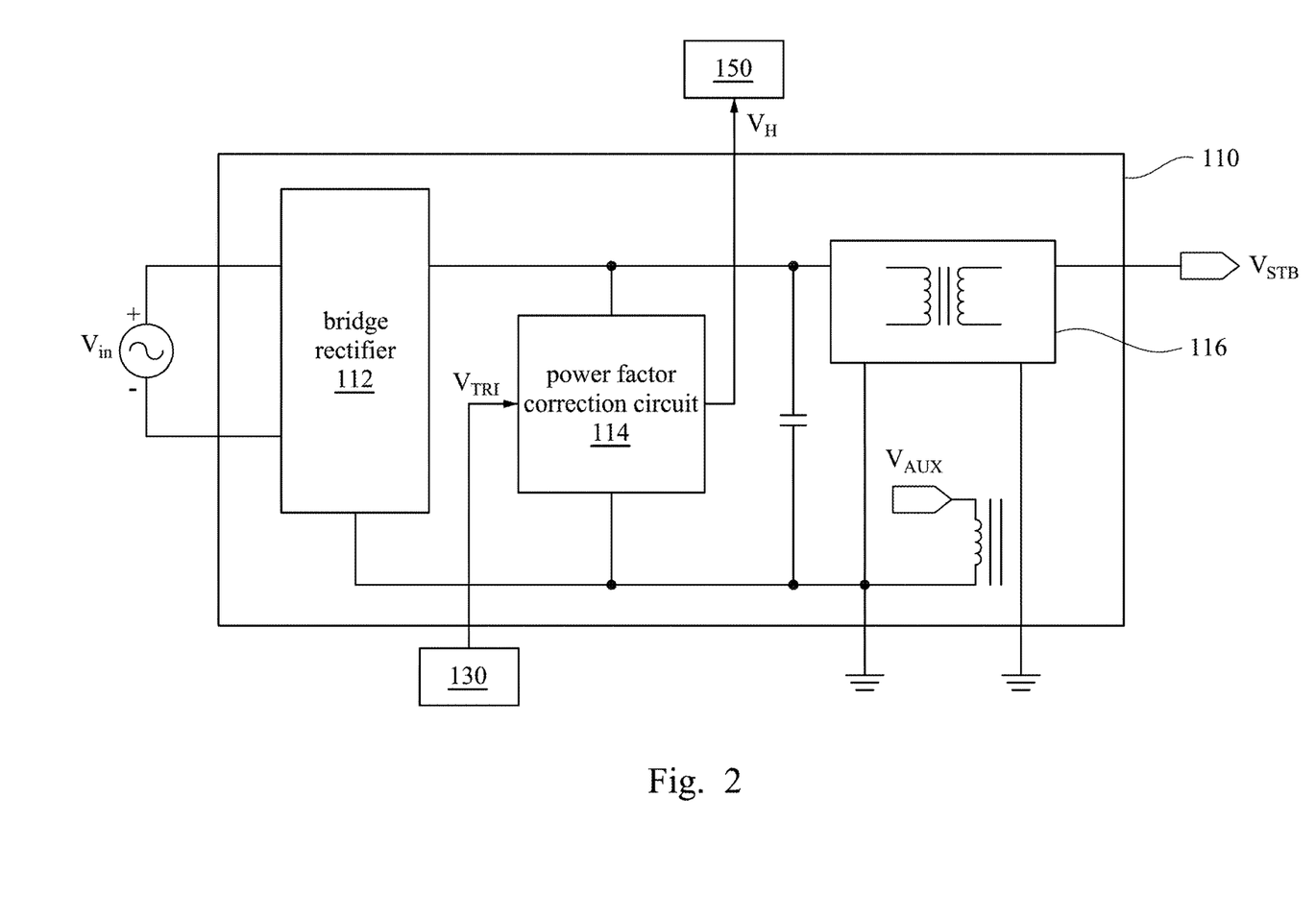
FIG. 2 is a configuration diagram of a part circuit of a charging system according to an embodiment of this disclosure.

The detailed structure and the operating principle of the power supply circuit 110, the detecting circuit 120, the triggering circuit 130, the connecting interface 140 and the main control circuit 150 will be described below with FIGS. 2-5. FIG. 2 illustrates a configuration diagram of the power supply circuit 110 of the charging device 100 according to an embodiment of this disclosure. In FIG. 2, the power supply circuit 110 connects to the exterior power source (e.g., household power socket or other AC power source). The exterior power source provides input voltage $V_{in}$ to the power supply circuit 110. The power supply circuit 110 includes a bridge rectifier 112 circuit and a power factor correction (PFC) circuit 114. The bridge rectifier 112 can be any kind of electric bridge based on practical applications and is not limited thereto.

After the input voltage $V_{in}$ is rectified via the bridge rectifier 112, it will supply power to the power factor correction circuit 114. When the charging device 100 is in the standby mode, the output of the bridge rectifier 112 and the power factor correction circuit 114 is converted by a transformer 116 into the standby voltage $V_{STB}$ at a secondary side of the transformer 116, and into the auxiliary voltage $V_{AUX}$ at a primary side of the transformer 116. After the charging device 100 switched from the standby mode to the operating mode, the power factor correction circuit 114 (or the power supply circuit 110) provides the main operating voltage $V_H$ to the main control circuit 150.

It should be noted that a triggering signal $V_{TRI}$ of the triggering circuit 130 is generated in response to the detection signal that is generated when the detecting circuit 120 connects to the energy storage element 160. When the charging device 100 doesn't connect to the energy storage element 160, the detecting circuit 120 won't generate the detection signal, and the triggering circuit 130 won't generate the triggering signal $V_{TRI}$, neither. Because the power factor correction circuit 114 doesn't receive the triggering signal $V_{TRI}$ from the triggering circuit 130, it won't generate the main operating voltage $V_H$, and accordingly, the main control circuit 150 won't provide the output voltage $V_{out}$. To be brief, the charging device 100 only generates the standby voltage $V_{STB}$ and the auxiliary voltage $V_{AUX}$ when it is not connected to the energy storage element 160. Accordingly, there will be no unnecessary or undesired energy consumption.

Figure 3A:
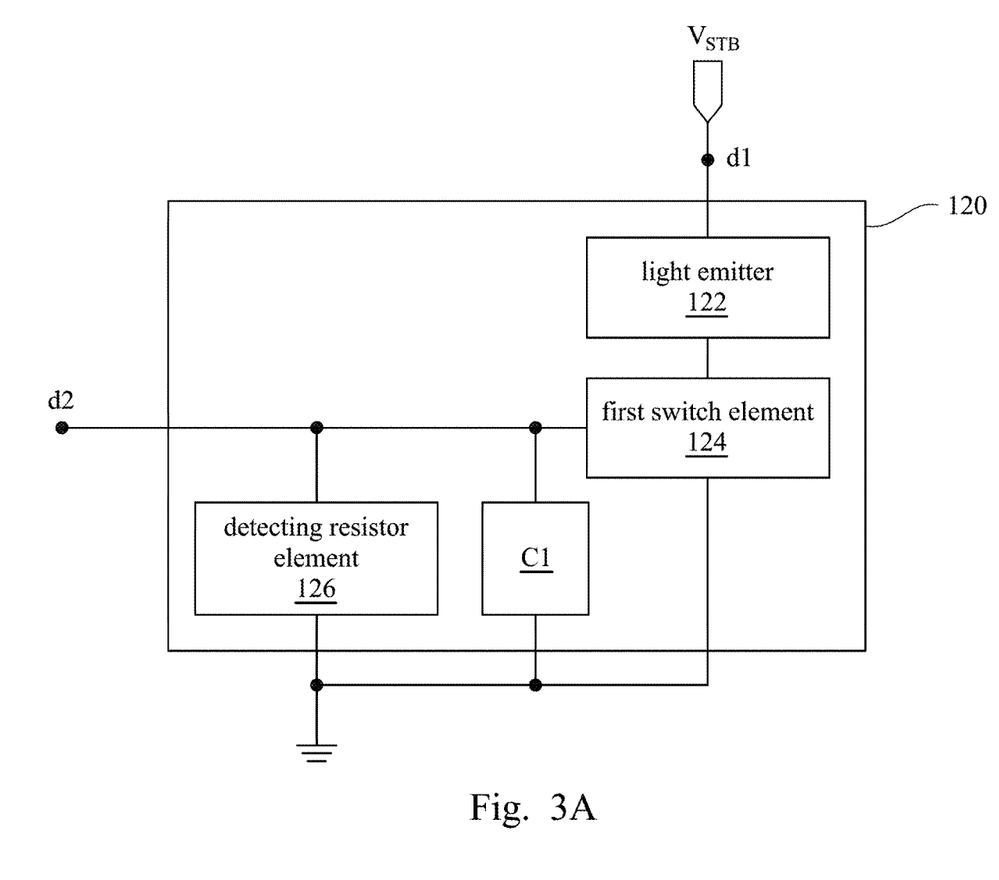
FIG. 3A is a configuration diagram of a part circuit of a charging system according to an embodiment of this disclosure.

Referring to FIG. 3A, FIG. 3A illustrates a configuration diagram of the detecting circuit 120 of the charging device 100 according to an embodiment of this disclosure. The detecting circuit 120 includes a light emitter 122 of an optical coupling element, a first switch element 124 and a detecting resistor element 126, and the detecting circuit 120 can selectively equipped with a capacitor C1. The light emitter 122 connects to one terminal of the first switch element 124. Another terminal of the first switch element 124 connects to the detecting resistor element 126 and the capacitor C1. The detecting circuit 120 receives the standby voltage $V_{STB}$ from the power supply circuit 110.

Figure 3B:
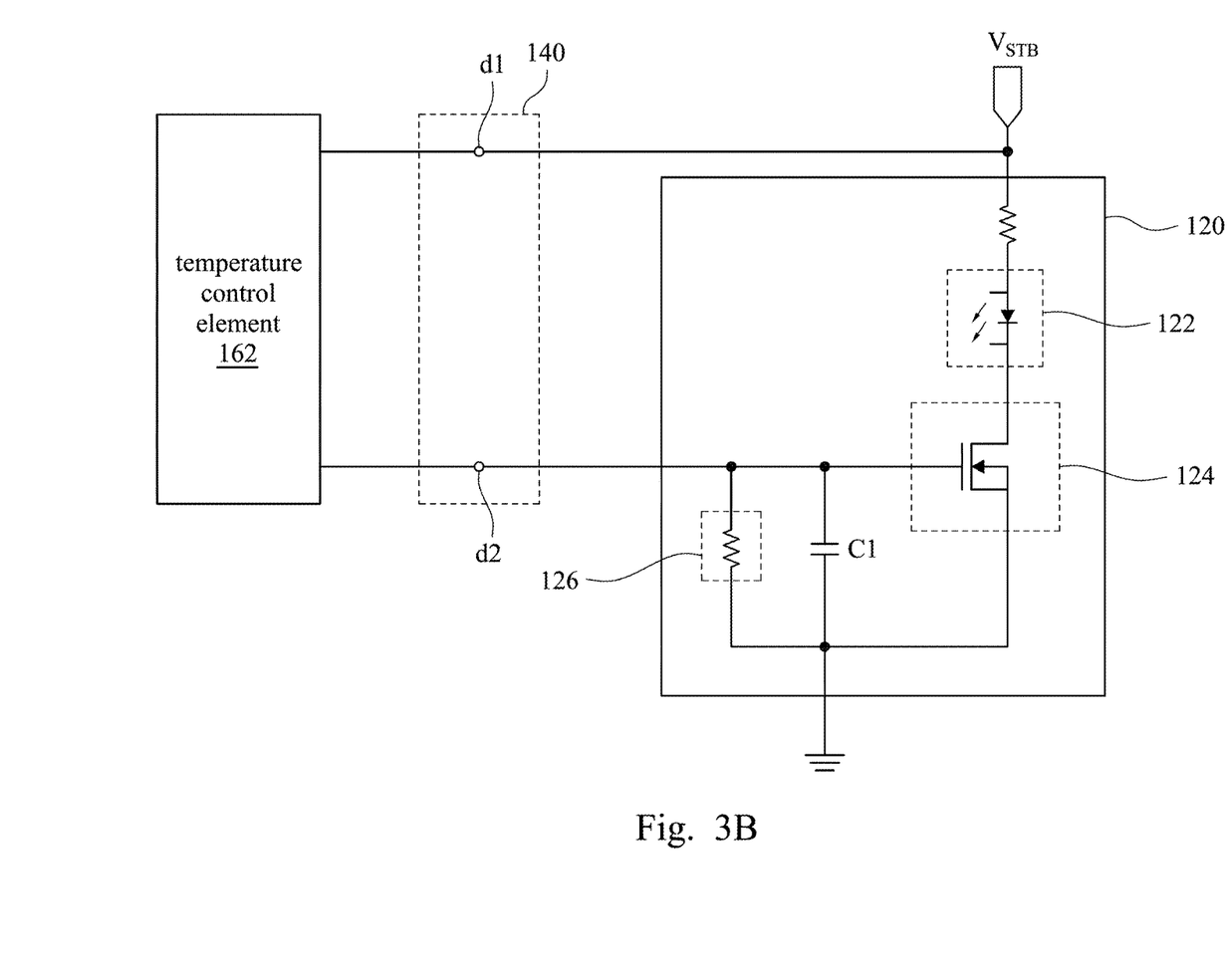
FIG. 3B is a circuit diagram of a part circuit of a charging system according to an embodiment of this disclosure.

FIG. 3B illustrates the circuit diagram of the detecting circuit 120 of FIG. 3A and its connection relationship to ambient elements. In FIG. 3B, the first switch element 124 is a transistor. In this embodiment, the first switch element 124 can be a MOSFET with a source terminal, a gate terminal and a drain terminal, but the type of transistor of the first switch element 124 is not limited in this regard. In practical applications, the first switch element 124 can be replaced with another equivalent transistor switch such as a bipolar transistor, a triode switch or other switch element. The detecting resistor element 126 connects with the capacitor C1 in parallel, and both the detecting resistor element 126 and the capacitor C1 connect to the gate of the first switch element 124. The detecting circuit 120 separately connects to the terminals d1 and d2 of the connecting interface 140. The terminals d1 and d2 of the connecting interface 140 separately connect to the two terminals of the temperature control element 162 of the energy storage element 160.

Referring to FIG. 3B, if the terminals d1 and d2 of the connecting interface 140 don't connect to the temperature control element 162 of the energy storage element 160, the connecting interface 140 is an open circuit, the terminal d2 is floating, and the gate terminal of the first switch element 124 is grounded via the detecting resistor element 126. That is, the voltage level of the gate terminal is low, so the first switch element 124 is turned off. Because the first switch element 124 is turned off, there is no current flowing through the light emitter 122, and accordingly, the light emitter 122 doesn't operate. On the other hand, when the charging device 100 connects to the energy storage element 160, the connecting interface 140 will connect to the two terminals of the temperature control element 162 of the energy storage element 160. That is, the two terminals of the temperature control element 162 will connect to the detecting circuit 120 via the connecting interface 140.

As shown in FIG. 3B, the connecting interface 140 connects to the temperature control element 162, the standby voltage $V_{STB}$ is sent to the terminal d1 of the detecting circuit 120 and the temperature control element 162. The standby voltage $V_{STB}$ is divided at the node (terminal d2) between the temperature control element 162 and the detecting resistor element 126, so as to generate a divided voltage $V_{d2}$ at the terminal d2. Ideally, the divided voltage $V_{d2}$ is $$V_{d2} = \frac{R_{126}}{R_{162} + R_{126}} V_{STB},$$

wherein $R_{126}$ is a constant resistance of the detecting resistor element 126 and $R_{162}$ is the resistance of the temperature control element 162. It should be noted that the resistance $R_{162}$ will change dynamically as the temperature changes.

In present disclosure, the detecting resistor element 126 is set to have a appropriate resistance. Within a normal temperature range (i.e., the energy storage element 160 isn't overheating), the divided voltage $V_{d2}$ divided by the temperature control element 162 and the detecting resistor element 126 has to be higher than a threshold voltage Vth of the first switch element 124. That is, when the charging device 100 connects to the energy storage element 160, the divided voltage $V_{d2}$ will turn on the first switch element 124. Since the first switch element 124 is turned on, the current formed by the standby voltage $V_{STB}$ flows through the light emitter 122 to generate the detecting signal (e.g., light beam signal), which represents that the energy storage element 160 is connecting to the charging device 100 is detected.

Figure 4:
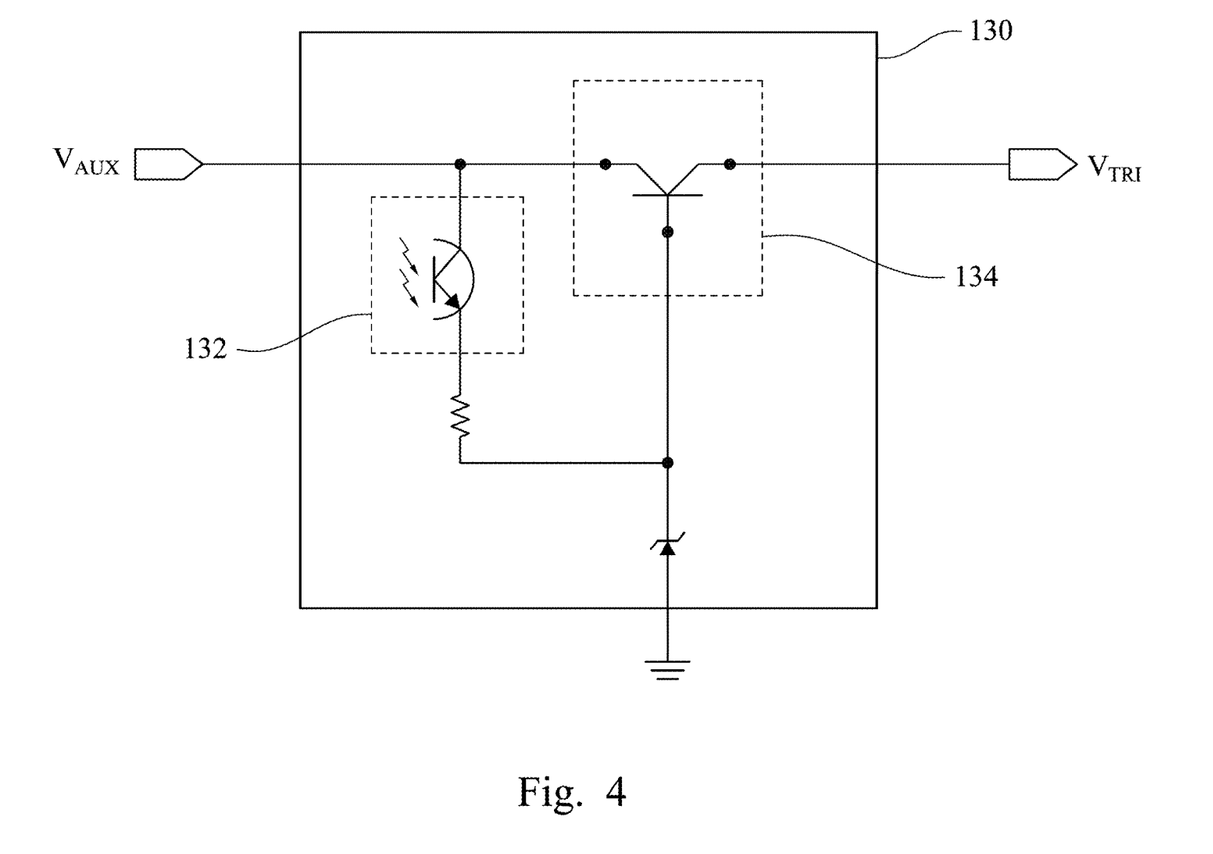
FIG. 4 is a configuration diagram of a part circuit of a charging system according to an embodiment of this disclosure.

FIG. 4 illustrates a configuration diagram of the triggering circuit 130 of the charging device 100 according to an embodiment of this disclosure. The triggering circuit 130 includes a light detector 132 and a second switch element 134. The triggering circuit 130 connects to the power supply circuit 110 to receive the auxiliary voltage $V_{AUX}$. The second switch element 134 can be a bipolar transistor or a triode, in practical applications, the second switch element 134 can be replaced with another equivalent transistor switch, such as MOSFET switch or other switch element. The light detector 132 is used to receive the detecting signal transmitted by the light emitter 122.

When the charging device 100 doesn't connect to the energy storage element 160, the light detector 132 won't receive the detecting signal emitted by the light emitter 122 and will remain off, and accordingly, the triggering circuit 130 won't operate. When the charging device 100 connects to the energy storage element 160, the light detector 132 will receive the detecting signal emitted by the light emitter 122 and be turned on. By then, the auxiliary voltage $V_{AUX}$ will pass through the light detector 132 and further turn on the second switch element 134, so the auxiliary voltage $V_{AUX}$ can pass through the second switch element 134 to generate the triggering signal $V_{TRI}$. The triggering signal $V_{TRI}$ triggers the power factor correction circuit 114 of the power supply circuit 100 to output the main operating voltage $V_H$.

Figure 5:
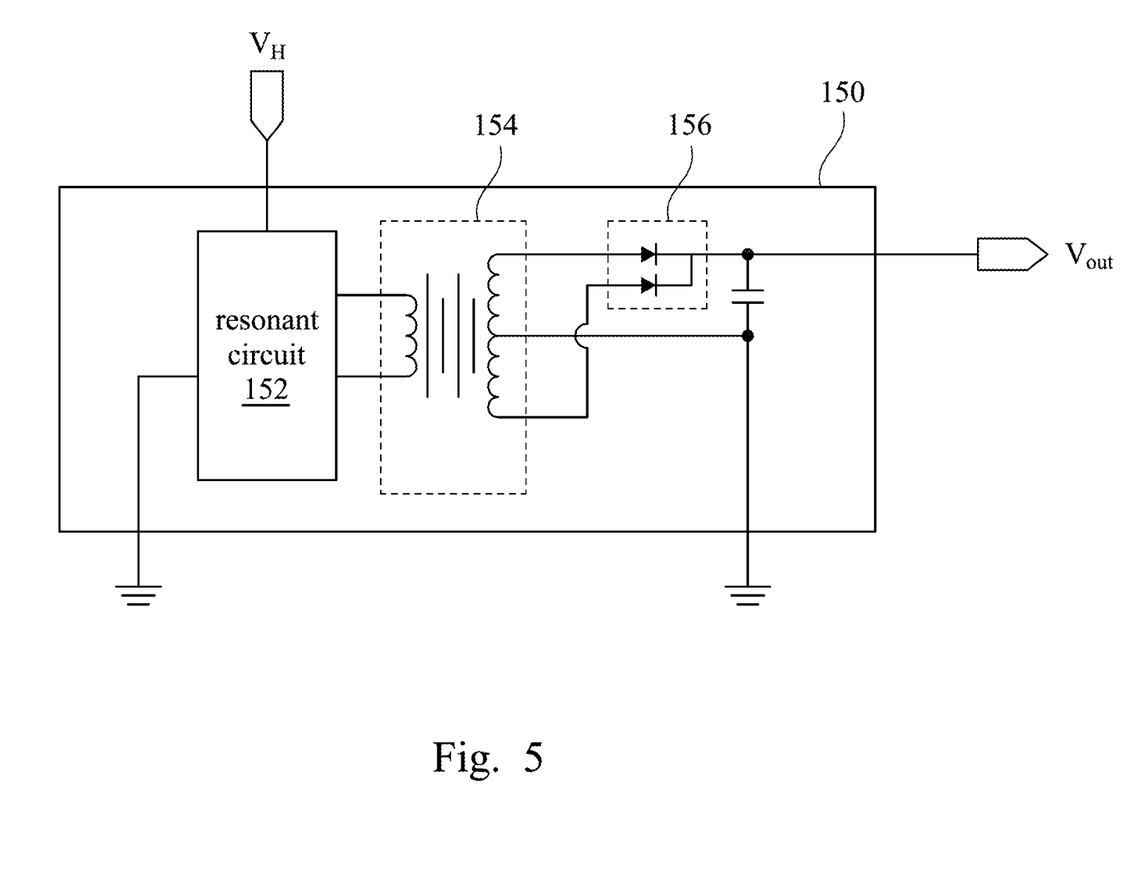
FIG. 5 is a configuration diagram of a part circuit of a charging system according to an embodiment of this disclosure.

FIG. 5 illustrates a configuration diagram of the main control circuit 150 of the charging device 100 according to an embodiment of this disclosure. The main control circuit 150 includes a resonant circuit 152 and a transforming unit 154. The main control circuit 150 receives the main operating voltage $V_H$, as shown in FIG. 5. When the power factor correction circuit 114 of the power supply circuit 110 is triggered, the main operating voltage $V_H$ will be output to the resonant circuit 152 of the main control circuit 150. The resonant circuit 152 will then transmit the main operating voltage $V_H$ to the transforming unit 154 to be transformed. In addition, a rectifying element 156 can be added into the main control circuit 150, so as to further rectify the voltage transformed by the transforming unit 154 to output the output voltage $V_{out}$. The output voltage $V_{out}$ can charge the energy storage element 160.

It can be understood from the above that the charging device 100 can automatically determine whether the energy storage element 160 is connecting to the charging device 100 itself. Based on the connection of the energy storage element 160, the charging device 100 can determine whether to convert energy to provide a charging voltage (the output voltage $V_{out}$) or not. Before the energy storage element 160 connects to the charging device 100, the charging device 100 is in the standby mode and doesn't have to convert energy to generate the output voltage $V_{out}$. Accordingly, the present disclosure provides a technique of minimizing the energy consumption when a charging device is in the standby mode with a conception similar to the hot swapping mechanism applied to a USB device.

Figure 6:
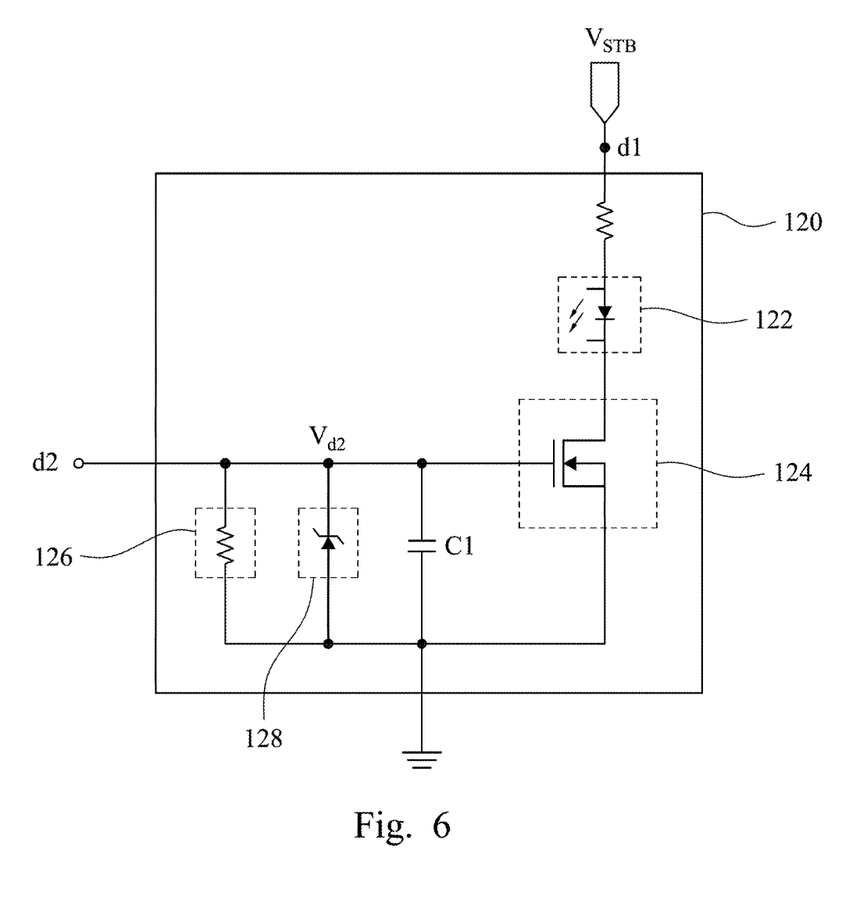
FIG. 6 is a circuit diagram of a part circuit of a charging system according to an embodiment of this disclosure.

In another embodiment of the present disclosure, a voltage stabilizing diode 128 can be further added into the detecting circuit 120, as shown in FIG. 6. FIG. 6 is a circuit diagram of the detecting circuit 120 of the charging device 100 according to an embodiment of this disclosure. The voltage stabilizing diode 128 can be a zener diode and has a reverse breakdown voltage. When the reverse voltage difference between two terminals of the voltage stabilizing diode 128 doesn't exceed the reverse breakdown voltage, the voltage stabilizing diode 128 is regarded an open circuit. When the reverse voltage difference between two terminals of the voltage stabilizing diode 128 exceeds the reverse breakdown voltage, the voltage stabilizing diode 128 will be turn on. The voltage stabilizing diode 128 connects to the detecting resistor element 126 in parallel and connects to the gate terminal of the first switch element 124. In this embodiment, the reverse breakdown voltage of the voltage stabilizing diode 128 is higher than the threshold voltage Vth of the first switch element 124.

When the charging device 100 connects to the energy storage element 160, the connecting interface 140 connects to the temperature control element 162 of the energy storage element 160. In normal condition, as previously described, the standby voltage $V_{STB}$ is input to the terminal d1 of the detecting circuit 120 and the temperature control element 162. The standby voltage $V_{STB}$ is divided at the node (terminal d2) between the temperature control element 162 and the detecting resistor element 126, so as to generate a divided voltage $V_{d2}$ at the terminal d2. Ideally, the divided voltage $V_{d2}$ is $$V_{d2} = \frac{R_{126}}{R_{162} + R_{126}} V_{STB},$$

wherein $R_{126}$ is a constant resistance of the detecting resistor element 126 and $R_{162}$ is the resistance of the temperature control element 162. The resistance $R_{162}$ will change dynamically as the temperature changes. When the temperature of the energy storage element 160 is within the normal range (not overheating), the divided voltage $V_{d2}$ is higher than the threshold voltage Vth of the first switch element 124 but lower than the reverse breakdown voltage of the voltage stabilizing diode 128, so the first switch element 124 is turned on and make the light emitter 122 generate the detecting signal. Accordingly, the charging device 100 can work normally and charge the energy storage element 160.

However, when the temperature of the energy storage element 160 raises, the resistance $R_{162}$ will decrease because the temperature control element 162 has the characteristic of negative temperature coefficient thermistor. Since the resistance $R_{162}$ of the temperature control element 162 decreases, the divided voltage $V_{d2}$ will increase. When temperature of the energy storage element 160 is overheating and resulting in the divided voltage $V_{d2}$ exceeding the reverse breakdown voltage of the voltage stabilizing diode 128, the voltage stabilizing diode 128 will be turned on and make the terminal d2 (the gate terminal of the first switch element 124) grounded via the voltage stabilizing diode 128. Then, the first switch element 124 will be turned off.

Because the first switch element 124 is turned off, the light emitter 122 won't work, and the triggering circuit 130 will cease to trigger the power supply circuit 110 to provide the main operating voltage $V_H$ to the main control circuit 150 and the output voltage $V_{out}$ will stop (to charge). Accordingly, taking the advantage of the characteristics of the temperature control element 162 and the voltage stabilizing diode 128, charging device 100 can have over-temperature protection function.

With the revelation of the present disclosure, charging system can minimize the energy consumption caused when the charging device 100 is in the standby mode. Furthermore, the charging system can also provide protection mechanism when a battery (e.g., the energy storage element 160) is overheating, which makes the usage of products more safe.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A charging device, used to charge an energy storage element, the charging device comprising:
   a main control circuit configured to provide an output voltage;
   a connecting interface, when the energy storage element connects to the charging device, the connecting interface is coupled to two terminals of a temperature control element;
   a power supply circuit coupled to the connecting interface and the main control circuit and configured to selectively provide a main operating voltage, when the energy storage element connects to the charging device, the power supply circuit provides a standby voltage to a first terminal of the temperature control element; and
   a detecting circuit coupled to the connecting interface, the detecting circuit comprising;
      an optical coupling element, the power supply circuit coupled to a first terminal of the optical coupling element;
      a switch element, a first terminal of the switch element coupled to a second terminal of the optical coupling element a control terminal of the switch element coupled to a second terminal of the temperature control element; and
      a detecting resistor element, a first terminal of the detecting resistor element coupled to the second terminal of the temperature control element and the control terminal of the switch element,
   when the energy storage element connects to the charging device, the detecting circuit generates a detecting signal, and the detecting signal is used to trigger the power supply circuit to provide the main operating voltage to the main control circuit, so as to make the main control circuit to charge the energy storage element by the output voltage, wherein when temperature of the energy storage element exceeds a threshold, the temperature control element makes the detecting circuit not to generate the detecting signal and the power supply circuit ceases to provide the main operating voltage to the main control circuit and the main control circuit stops providing the output voltage.

2. The charging device of claim 1, wherein the standby voltage is divided by the detecting resistor element and the temperature control element to generate a divided voltage, the divided voltage turns on the switch element, making the optical coupling element generate the detecting signal.

3. The charging device of claim 1, wherein the detecting circuit further comprises:
   a voltage stabilizing diode coupled between the control terminal of the switch element and a ground terminal, when the temperature changes and causes a divided voltage divided from the standby voltage by the detecting resistor element and the temperature control element exceeds a breakdown voltage level of the voltage stabilizing diode, the switch element is turned off, and the optical coupling element ceases to generate the detecting signal.

4. The charging device of claim 1, wherein the temperature control element is an external thermistor disposed adjacently to a surface of the energy storage element or a built-in thermistor disposed within the energy storage element.

5. A charging system, comprising:
   an energy storage element comprising a temperature control element;
   a charging device configured to charge the energy storage element, the charging device comprising:
   a main control circuit configured to provide an output voltage;
   a connecting interface, when the energy storage element connects to the charging device, the connecting interface is coupled to two terminals of the temperature control element;
   a power supply circuit coupled to the connecting interface and the main control circuit and configured to selectively provide a main operating voltage, when the energy storage element connects to the charging device, the power supply circuit provides a standby voltage to a first terminal of the temperature control element; and
   a detecting circuit coupled to the connecting interface, the detecting circuit comprising:
      an optical coupling element, the power supply circuit coupled to a first terminal of the optical coupling element;
      a switch element, a first terminal of the switch element coupled to a second terminal of the optical coupling element, a control terminal of the switch element coupled to a second terminal of the temperature control element; and
      a detecting resistor element, a first terminal of the detecting resistor element coupled to the second terminal of the temperature control element and the control terminal of the switch element,
   when the energy storage element connects to the charging device, the detecting circuit generates a detecting signal, and the detecting signal is used to trigger the power supply circuit to provide the main operating voltage to the main control circuit, so as to make the main control circuit to charge the energy storage element by the output voltage, wherein when temperature of the energy storage element exceeds a threshold, the temperature control element makes the detecting circuit not to generate the detecting signal and the power supply circuit ceases to provide the main operating voltage to the main control circuit and the main control circuit stops providing the output voltage.

6. The charging system of claim 5, wherein the standby voltage is divided by the detecting resistor element and the temperature control element to generate a divided voltage, the divided voltage turns on the switch element, making the optical coupling element generate the detecting signal.

7. The charging system of claim 5, wherein when the energy storage element doesn't connect to the charging device, the switch element is turned off and the optical coupling element doesn't generate the detecting signal.

8. The charging system of claim 5, wherein the detecting circuit further comprises:
   a voltage stabilizing diode coupled between the control terminal of the switch element and a ground terminal, when the temperature changes and causes a divided voltage divided from the standby voltage by the detecting resistor element and the temperature control element exceeds a breakdown voltage level of the voltage stabilizing diode, the switch element is turned off, and the optical coupling element ceases to generate the detecting signal.

* * * * *